United States Patent [19]
Sikdar et al.

[11] Patent Number: 6,039,878
[45] Date of Patent: Mar. 21, 2000

[54] RECOVERY OF VOLATILE ORGANIC COMPOUNDS FROM EMULSION OF VOLATILE ORGANIC COMPOUNDS IN WATER BY PERVAPORATION

[75] Inventors: Subhas Sikdar; Leland Vane, both of Cincinnati, Ohio

[73] Assignee: The United States of America as represented by the United States Environmental Protection Agency, Washington, D.C.

[21] Appl. No.: 08/862,308

[22] Filed: May 23, 1997

Related U.S. Application Data

[60] Provisional application No. 60/018,193, May 23, 1996.

[51] Int. Cl.⁷ .................................................. B01D 15/00
[52] U.S. Cl. .............................. 210/640; 210/649; 95/45; 95/50
[58] Field of Search ..................... 210/640, 649; 95/43, 45, 46, 50, 502.1

[56] References Cited

U.S. PATENT DOCUMENTS

| | | | |
|---|---|---|---|
| 4,960,520 | 10/1990 | Semmens | 210/640 |
| 5,472,613 | 12/1995 | Schofield | 210/649 |
| 5,753,008 | 5/1998 | Friensen et al. | 95/45 |

FOREIGN PATENT DOCUMENTS

| | | | |
|---|---|---|---|
| 04116426A | 11/1992 | Germany | 210/640 |
| 360147201A | 8/1985 | Japan | 210/640 |

*Primary Examiner*—Ana Fortuna
*Attorney, Agent, or Firm*—Browdy and Neimark

[57] ABSTRACT

Volatile organic compounds (VOCS) can be removed from surfactant solutions using pervaporation with hydrophobic pervaporation membranes. This process can be used to remove volatile non-laqueous phase liquids from surfactant-based soil washing and soil flushing solutions for recovery of the volatile compounds and reuse of the surfactant. The process of the present invention can also be used to separate VOCs from industrial process streams containing surfactants for in-process recycling and reclamation of the VOCs and/or surfactants. In addition, the process of the present invention can be used to separate VOCs from industrial waste streams containing surfactants for waste volume reduction or for recovery/recycle of the VOCs and/or surfactant.

13 Claims, 11 Drawing Sheets

RECOVERY OF VOLATILE ORGANIC COMPOUNDS FROM EMULSION OF VOLATILE ORGANIC COMPOUNDS IN WATER BY PERVAPORATION

This application claims benefit of Provisional Application Ser. No. 60/018,193 filed May 23, 1996.

FIELD OF THE INVENTION

The present invention relates to a method for recovering and recycling volatile organic compounds from aqueous phase emulsions containing surfactants by pervaporation through membranes.

BACKGROUND OF THE INVENTION

Groundwater is often contaminated by volatile organic compounds, particularly chlorinated and aromatic hydrocarbons. Conventional separation technologies, such as distillation and liquid—liquid extraction, are not applicable because of the large volumes of water that must be treated.

Pump-and-treat methods of remediating nonaqueous phase liquids in groundwater are generally not satisfactory, primarily because the "pump" part of the technology cannot efficiently remove the contaminates from the aquifer. The organic compounds from the nonaqueous phase liquids slowly leak into the groundwater over a long period of time. Several attempts are being made by remediation companies to use surfactants to more efficacious removal of the non-aqueous phase liquid components by emulsifying them with an aqueous surfactant solution. Similarly, organic contaminants, which have been found to adhere strongly to soil particles, can be removed from soil more easily when a surfactant solution is pumped through the contaminant region. This process is called surfactant flushing. Although the "pump" part of technology is improved this way, the "treat" part becomes more complicated. Generally, two established methods can be used to dispose of the resulting emulsion:

(1) air or steam stripping, which is not a useful solution because the VOCs, which are then in air or condensed in a liquid form, still must be disposed of; and (2) bioremediation, which is unproven for VOCs, and, even were it successful, would require large installations.

Pervaporation is a technique wherein volatile organic compounds from an aqueous medium are preferentially transported across a thin membrane film. The source side of the membrane is wetted with the aqueous liquid, while vacuum or a sweep gas is used on the sink side of the membrane. The VOCs are collected from the sink side by condensation. It is customary to expect a concentration factor of 1000 or more. Most VOCs are hydrophobic, so that a hydrophobic membrane must be used. In contrast to other membrane filtration processes, pervaporation works according to a solution-diffusion mechanism. The membrane itself must be porous for pervaporation to work. In microfiltration or ultrafiltration, for example, porosity is the key to preferential transport, and the flux rate depends upon molecular size. In pervaporation, molecular interaction rather than molecular size is the determining factor.

For pervaporation to be economical and efficient, ultra-thin non-porous hydrophobic films of appropriate polymers, such as polydimethylsiloxane or polyether imide block copolymer, must be deposited onto a highly porous support matrix. The preferred configuration of the membrane modules is a hollow fiber.

SUMMARY OF THE INVENTION

It is an object of the present invention to overcome the aforementioned deficiencies in the prior art.

It is another object of the present invention to provide means for treating groundwater.

It is another object of the present invention to break emulsions using pervaporation.

It is still another object of the present invention to use pervaporation to break aqueous emulsions of volatile organic compounds.

According to the present invention, volatile organic compounds (VOCs) can be removed from surfactant solutions using pervaporation with hydrophobic pervaporation membranes.

The process of the present invention can be used to remove volatile non-aqueous phase liquids from surfactant-based soil washing and soil flushing solutions for recovery of the volatile compounds and reuse of the surfactant.

The process of the present invention can be used to separate VOCs from industrial process streams containing surfactants for in-process recycling and reclamation of the VOCs and/or surfactants.

The process of the present invention can be used to separate VOCs from industrial waste streams containing surfactants for waste volume reduction or for recovery/recycle of the VOCs and/or surfactant.

The energy required to break the emulsion is supplied via pumping energy. Simultaneously with breaking the emulsion, the VOCs are concentrated on the permeate side of a chosen hydrophobic membrane by a thousand-fold or more. The hydrophobic membrane allows preferential treatment of the VOCs through it. The surfactants, which are non-volatile and have a larger molecular size than the VOCs, do not diffuse through the membrane. The concentrated VOCs can then either be disposed of by thermal means, for instance, or can be recycled for reuse. The surfactant solution can be disposed of, depending upon the surfactant used. In the case of treating groundwater and soil flushing, the surfactant can be concentrated for recycling and reuse by subjecting the raffinate stream to reverse osmosis or ultra-filtration.

The method of the present invention removes the VOCs while at the same time concentrating them in a form that is amenable to economical disposal or reuse. The process requires much less energy than conventionally used stripping processes. The process is compact, and requires little space, and the method can be easily automated.

DETAILED DESCRIPTION OF THE INVENTION

In general, the lower molecular weight organic compounds are the more volatile organic compounds to be removed from wastewater or groundwater. Of course, the specific compounds to be removed will vary, depending upon the source of the pollution. However, among the volatile organic compounds that can be removed by the process of the present invention include, but are not limited to, N,N-dimethylnitrosamine; chloroethane; benzoic acid; EDTA; benzene; cytosine; acrolein; methylene chloride; acrylonitrile; 1,1-dichloroethane; 1,1,1-trichloroethane; chloroform; 1,2-trans-dichloroethylene; 1,2-dichloroethane; diphenylamine; benzothiazole; 1,4-dichlorobenzene; p-chloro-m-cresol; 1,2-dichlorobenzene; naphthalene; 1,1-diphenylhydrazine; p-nitroaniline; 4-bromophenyl phenyl ether; 2,6-dinitrotoluene; pentachlorophenol; 2-naphthylamine; 2-chloroethyl vinyl ether; dibromochloromethane; 1,1-dichloroethylene; 5-fluorouracil; trichlorofluoromethane; 1,1,2-trichloroethane; 1,2-dichloropropane; cyclohexanone; dichlorobromomethane; 1,2-dichloropropene; 1,1,2,2-tetrachloroethane; benzo[ghi] perylene; uracil; bis (2-chloroethoxy)methane; carbon tetrachloride; bromoform; phenol; bis(2-chloroisopropyl)ether; N-nitroso di-n-propylamine; 5-chlorouracil; toluene; thymine; trichloroethylene; isophorone; 2,4-dinitrophenol; benzo [a]pyrene; 5-bromouracil; o-anisidine; tetrachloroethylene; 2-chlorophenol; ethylbenzene; 1,2-dibromo-3-chloroproane; 3,4-benzofluoroanthrene; nitrobenzene; dibenzo[a,h]anthracene; adenine; 1,2,3,4-tetrahydronaphthalene; acetophenone; 4-nitrophenol; 2,4-dimethylphenol; p-xylene; chlorobenzene; hexachloroethane; dimethylphthalate.

The volatile organic compounds are concentrated at one side of the membrane, after which time they can be removed for reuse and recycling or disposed of appropriately.

While any type of hydrophobic membrane material can be used that is suitable for pervaporation, the membrane material should be non-reactive with the volatile organic compounds to be removed. The membranes are generally used in the form of flat sheets or, preferably, as hollow fibers.

The membranes used in the process of the present invention are generally made of polymers, the chemical structures of which range from simple hydrocarbons like polyethylene or polypropylene to silicone rubbers an the like. The choice of polymer for the membrane is dictated by the types of volatile organic compounds which are to be removed from the aqueous emulsion.

Among the polymers that can be used for the membrane are rubbery polymers and copolymers such as polydimethyl siloxane, poly(1-trimethylsiliyl-1-propyne), polyurethanes, polybutadiene polyether imides, polyether block polymers, and silicone polymers, styrene-butadiene rubber, nitrile butadiene rubber, and ethene-propene terpolymer.

Figure 1:
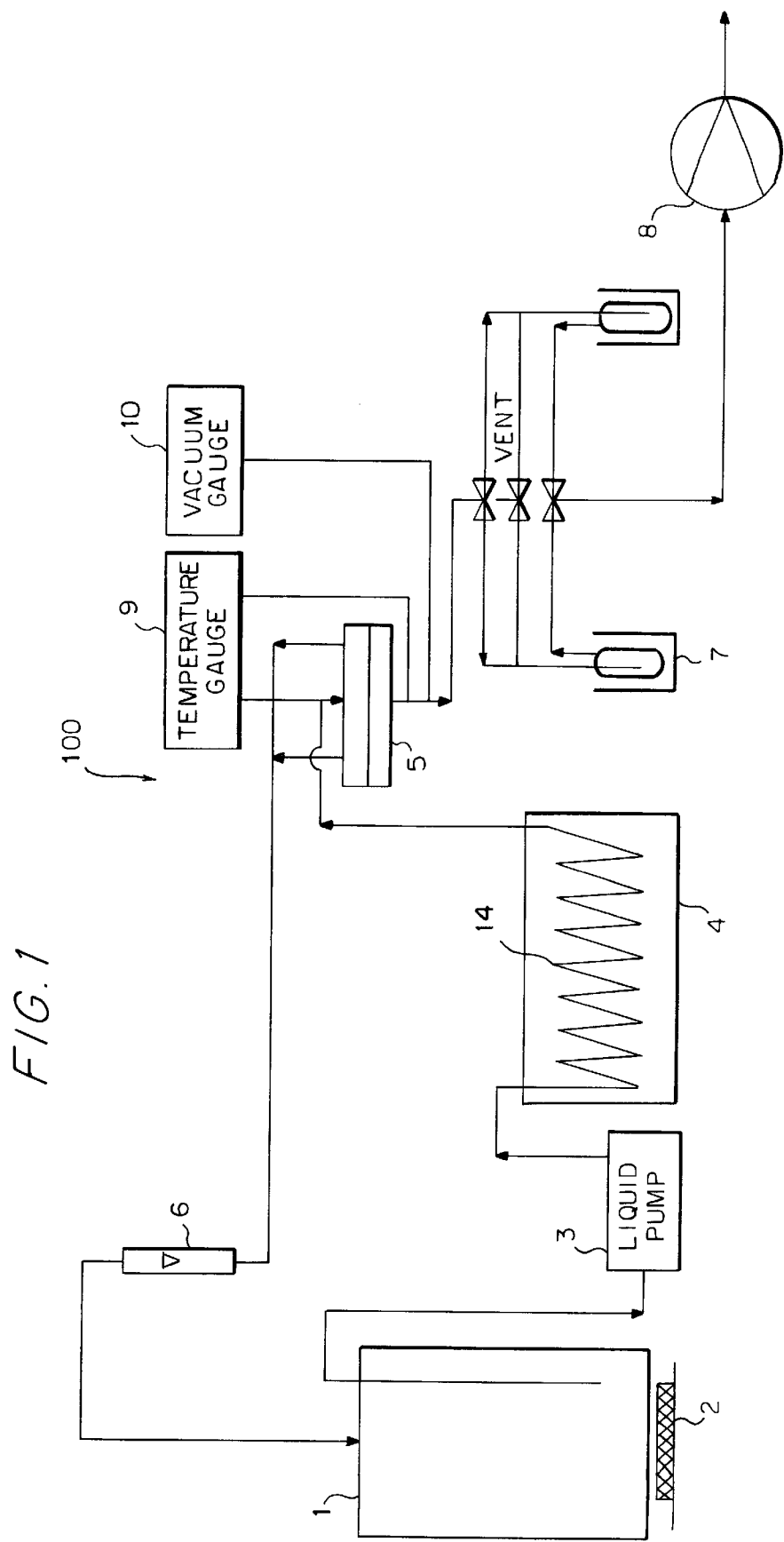
FIG. 1 shows a pervaporation unit for use in the present invention.

A schematic diagram of a pervaporation unit 100 according to the present invention is shown in FIG. 1. The feed tank 1 was a 20 liter stainless steel ASME pressure vessel. The feed mixture was circulated between the feed tank 1, which contained a magnetic stirrer 2, and the pervaporation cell 5 in a closed loop using a diaphragm liquid pump 3. Liquid flow rate was measured with a rotameter 6. The temperature of the feed liquid was held constant by passing the feed through a stainless steel coil 14 submerged in a thermostated bath 4. The feed liquid temperature and the permeate vapor temperature were monitored by two thermistor thermometers inserted in the upper and lower compartment of the cell, respectively. The temperature gauge is shown at 9 and the vacuum gauge at 10. The downstream vacuum system 8 stabilized the permeate pressure at 1±0.3 torr in the vicinity of the membrane measured with a Datametric electronic manometer. Permeate was collected in a cold trap 7, cooled with liquid nitrogen. After pervaporation had been initiated, the steady-state mass transfer regime was reached after a three to four hour equilibration time. After this initial regime, the steady-state permeation collection was initiated. The experiments were run batchwise over a time interval of two hours. The permeate liquid thus recovered was weighted and analyzed to evaluate permeation flux and selectivity. The total flux was simply calculated from the amount collected. The selectivity was calculated from the feed and permeate compositions.

A stainless steel Millipore membrane filtration cell was modified for use in cross-flow mode. The gap between the upper compartment and the membrane surface was 6 mm. The inner diameter of the cell was 9 cm, with an effective diameter of 7.6 cm and an effective membrane area of 45.5 cm$^2$. The membrane was supported by a perforated metal disc. The cell was sealed by Teflon O-rings. The feed entered the cell in the center of the upper compartment, flowed radially, and exited the cell at the border.

Two feed samples were taken for each run, one at the beginning and another at the end. The reported feed concentration was the average concentration of these two samples. One permeate sample was acquired during each run. The cold trap was first weighed after warming to room temperature, and then the permeate sample was dissolved in a small amount of methanol, transferred to a 10 mL volumetric flask, and diluted to 10 mL with methanol to the mark. All feed and permeate samples required dilution in water in order to fall within the analytical calibration range. When performing the dilution of feed samples with a needle syringe, it was found that the feed sample must be pressured (>5 psig) to avoid volatilization of the VOC when the sample was drawn into the syringe. All diluted samples were transferred immediately to 40 mL vials capped with Teflon-line septa.

The composition of both feed and permeate were analyzed by purge and trap gas chromatography (GC) using a Dynatech Dynawaters purge and trap autosampler and a Tremetrics 9001 GC equipped with a flame ionization. detector. In general, EPA test method 601 was followed with the following modifications:

(1) flame ionization detector
(2) megabnor column (J&W DB-624)
(3) Vocarb 3000 trap containing Carbopack B/Carboxen 1000 and 1001.

A small amount of antifoam agent was added to the surfactant solutions to reduce foaming in the purge vessel. The antifoam did not alter the analytical results for TCA.

In all of the experiments described below, Triton X-100, t-octylphenoxypolyethoxyethanol nonionic surfactant having a molecular formula of $C_8H_{17}C_6H_4(CH_2CH_2O)_yH$, was used as the test surfactant. For Triton X-100, y=9.5 (average molecular weight 625) and critical micelle concentration, CMC=0.15 g/L. 1,1,1-trichloroethane (TCA) was used as the model VOC. Silicone rubber, flat sheet 0.005 inches (127 μm thick, Dow Corning Silastic™, was used as the membrane.

EXAMPLE 1

Figure 2A:
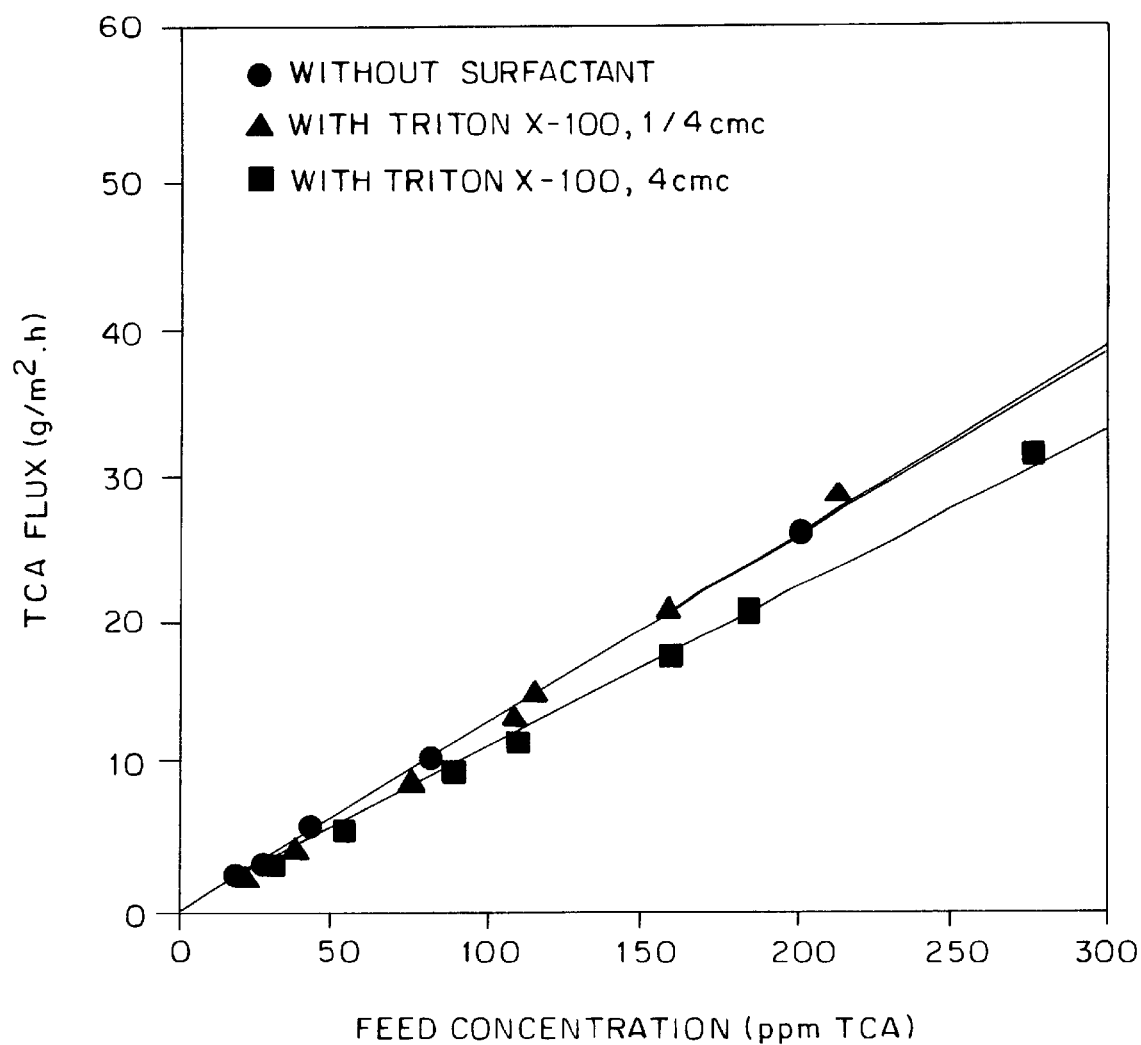
FIG. 2a shows a comparison of pervarporation without and with surfactant in a low concentration range, plotting TCA flux vs. feed concentration.
Figure 2B:
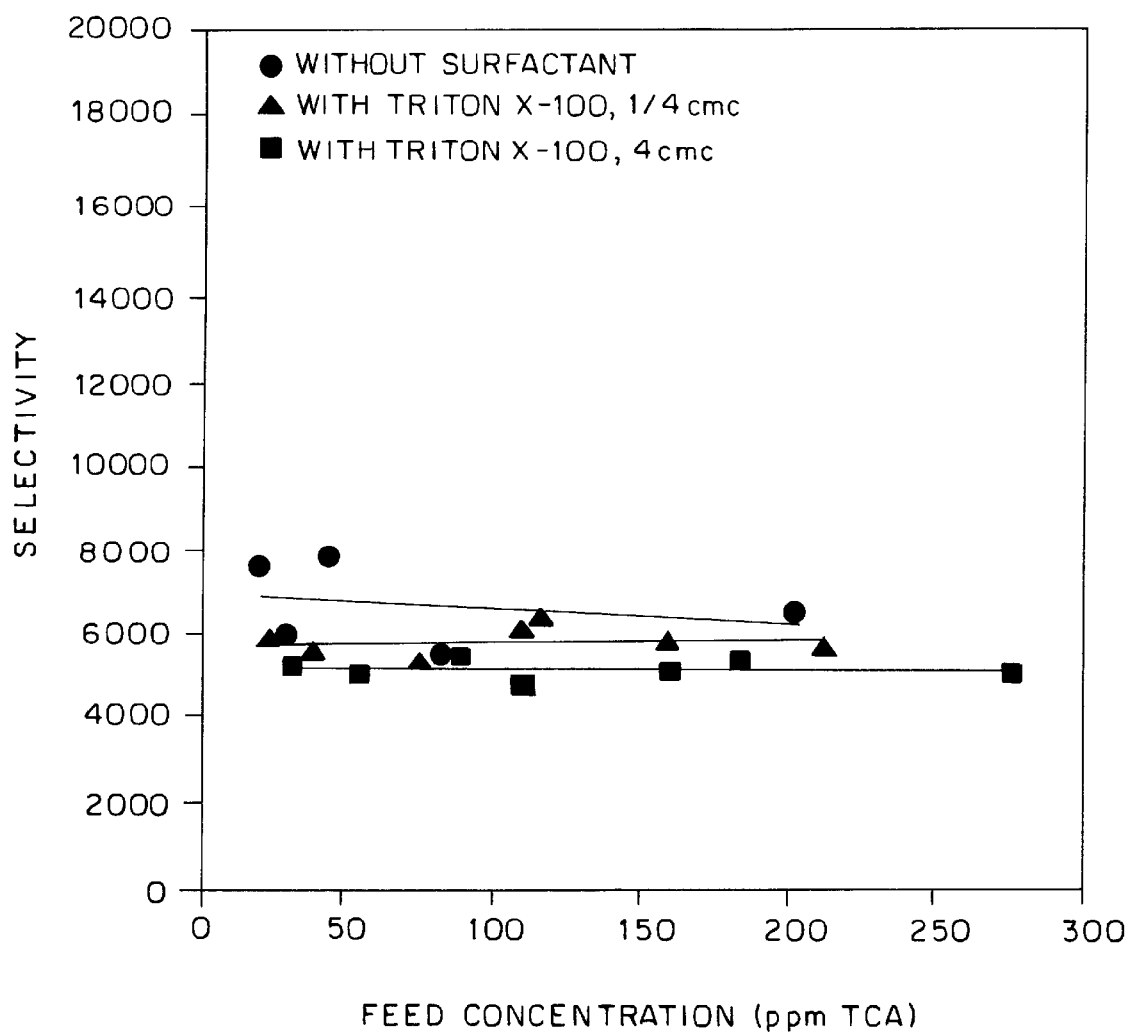
FIG. 2b shows a comparison of pervaporation without and with surfactant in low surfactant concentration range plotted as selectivity vs. feed concentration.

A series of experiments was performed with low surfactant concentrations of 0.25×CMC and 4×CMC, with TCA also at relatively low concentrations (0–300 mg/L). The results were compared to those obtained without surfactant. Pervaporation performance was evaluated in terms of component flux and membrane selectivity. As shown in FIGS. 2a and 2b, the data indicate that low surfactant concentrations do not appreciably affect either flux or selectivity. No difference is expected between the 0×CMC and the 0.25×CMC cases because the surfactant concentration in the latter is below that which allows micelle formation. However, one might expect to find a difference in the 4×CMC case due to the partitioning of some TCA into the micelles. The fact that even 4×CMC of the TritonX-100 does not significantly alter the pervaporation performance demonstrates that pervaporation is a technically feasible method for removing solubilized VOCs from surfactant solutions.

EXAMPLE 2

Figure 3A:
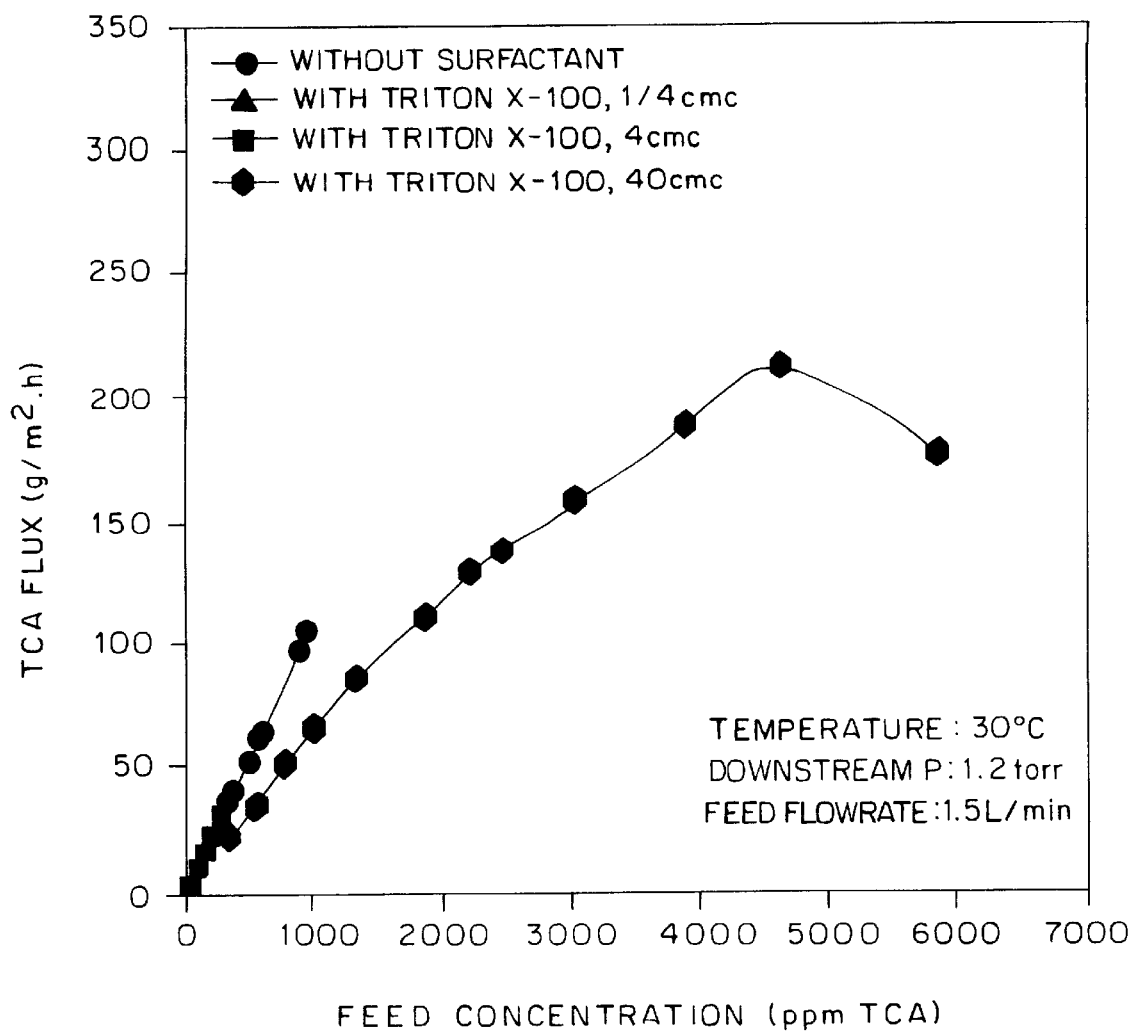
FIG. 3a shows pervaporation at high surfactant concentration with TCA concentration also in the high range, plotted as TCA flux vs. feed concentration.
Figure 3B:
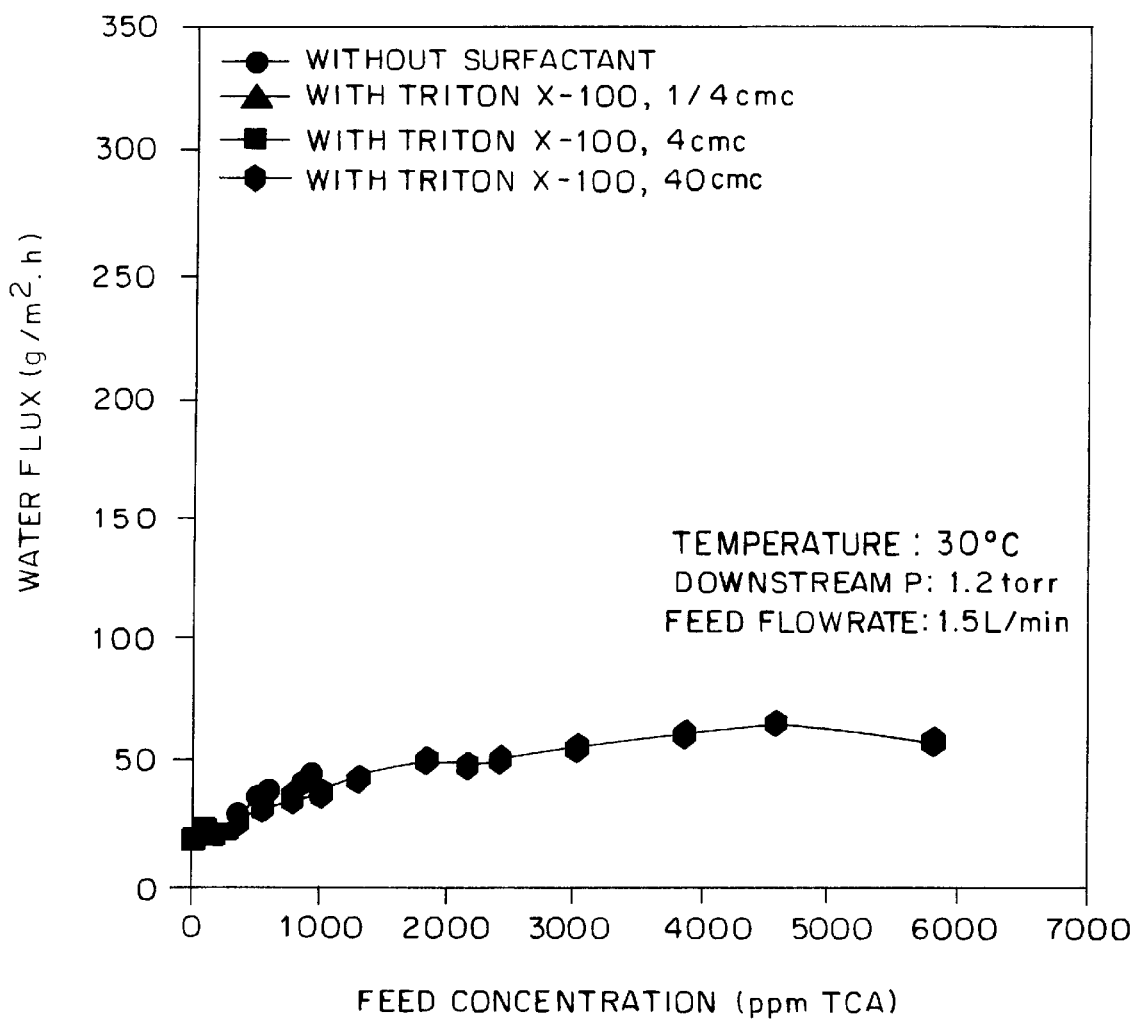
FIG. 3b shows pervaporation at high surfactant concentration with TCA concentration in the high range plotted as water flux vs. feed concentration.
Figure 3C:
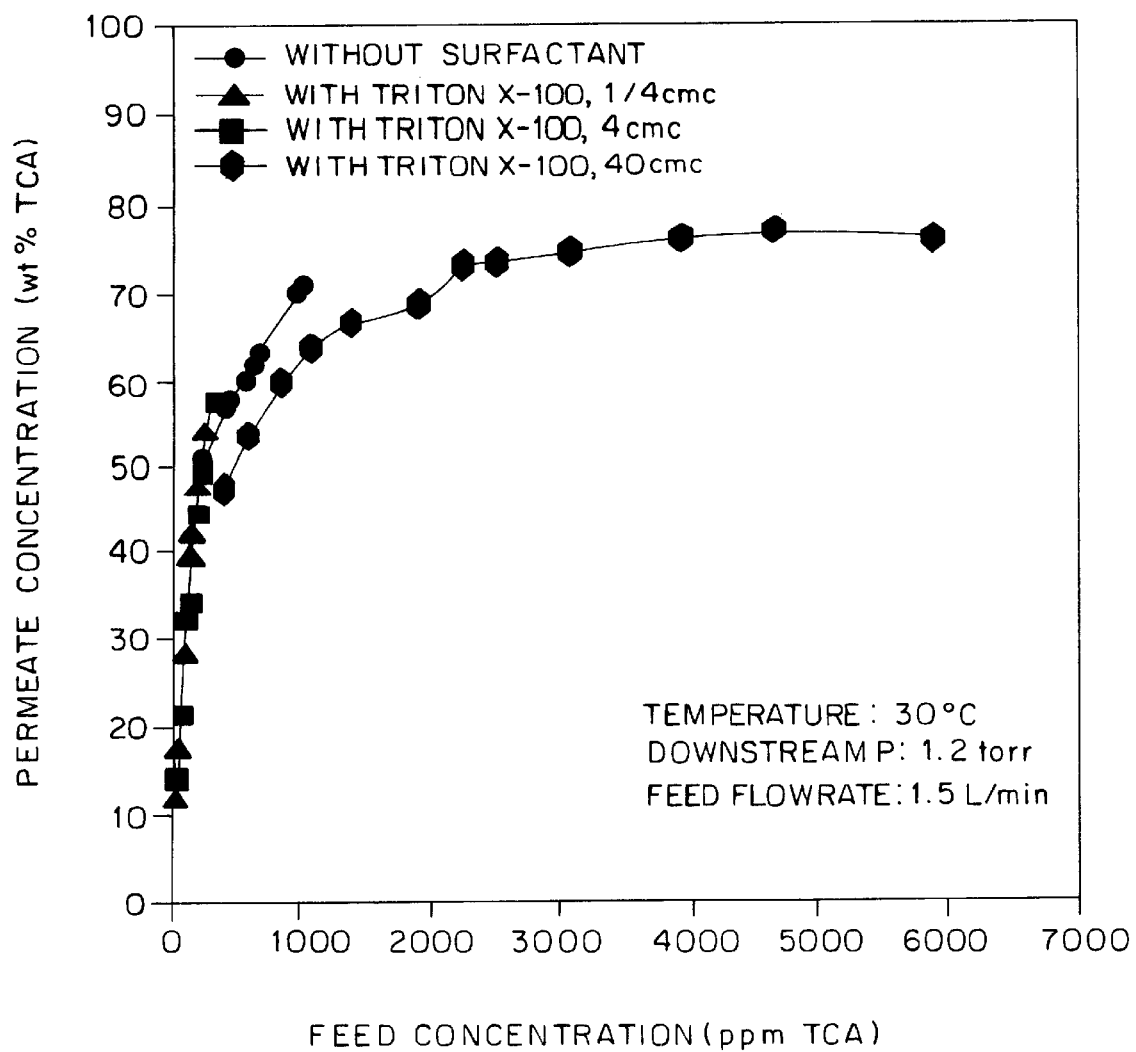
FIG. 3c shows pervaporation at high surfactant concentration with TCA concentration in high range plotted as permeate concentration vs. feed concentration.
Figure 3D:
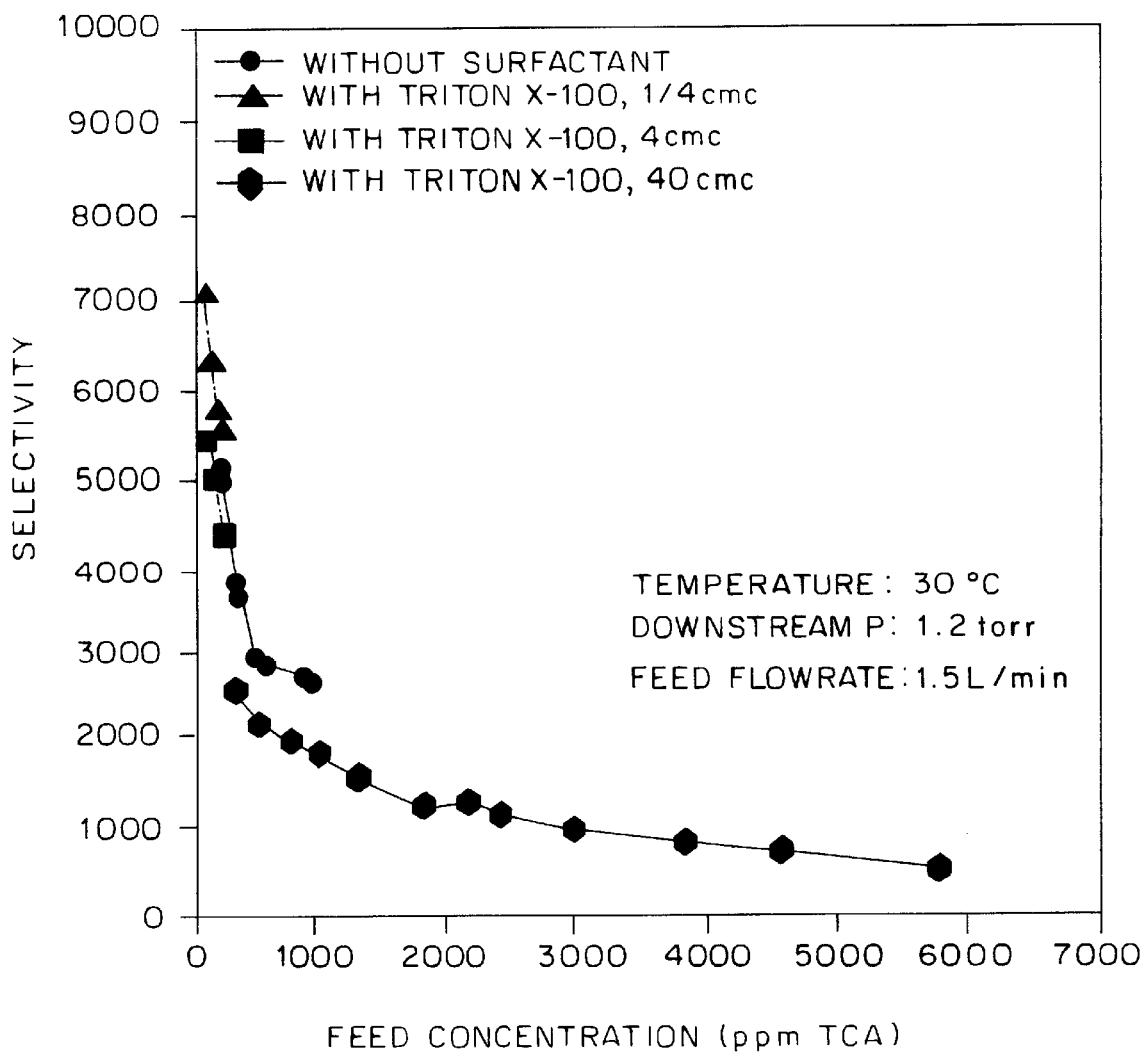
FIG. 3d shows pervaporation at high surfactant concentration with TCA concentration in high range plotted as selectivity vs. feed concentration.
Figure 4A:
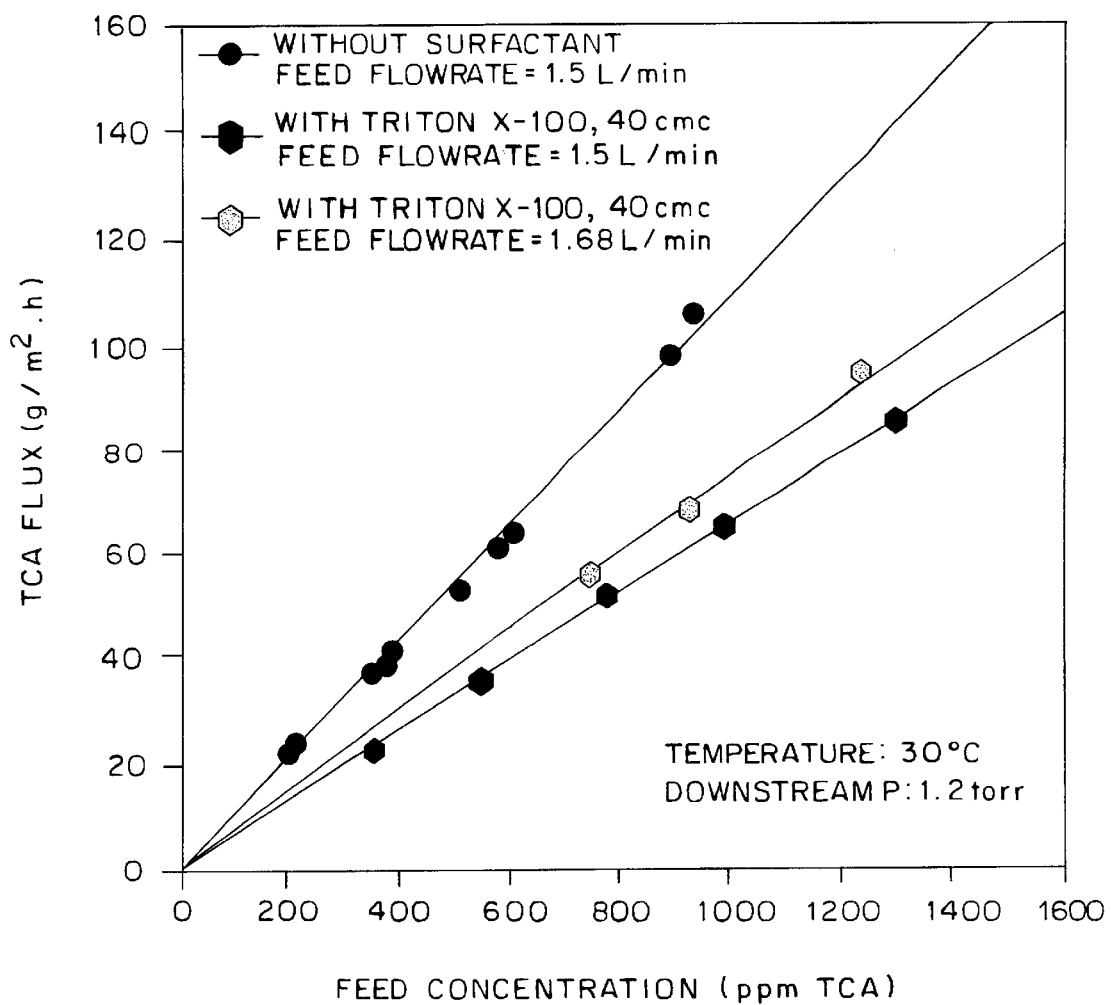
FIG. 4a shows a comparison of pervaporation without and with surfactant in high surfactant concentration range and the influence of the boundary layer effect plotted as TCA flux vs. feed concentration.
Figure 4B:
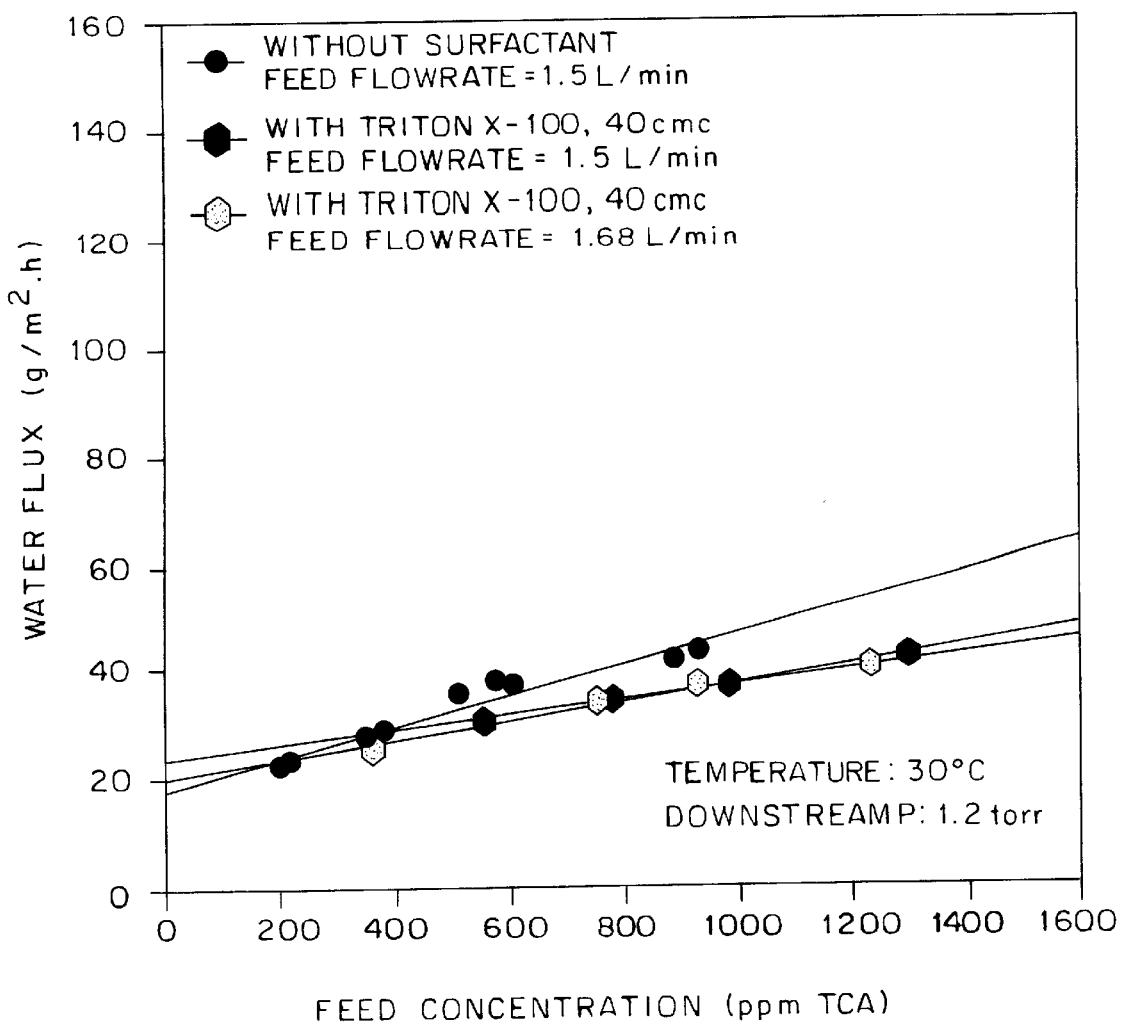
FIG. 4b shows a comparison of pervaporation without and with surfactant in a high surfactant concentration range and the influence of the boundary layer effect plotted as water flux vs. feed concentration.
Figure 4C:
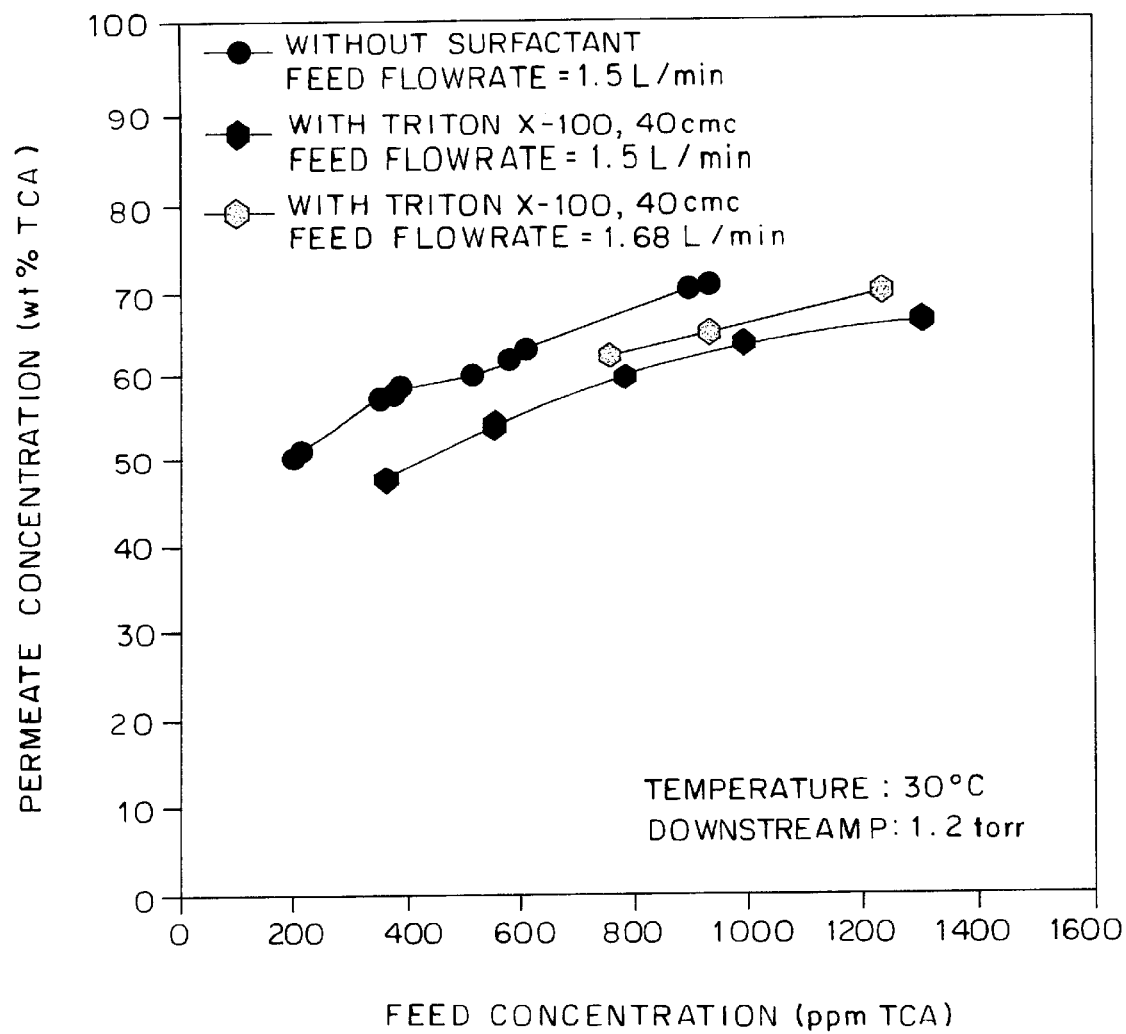
FIG. 4c shows a comparison of pervaporation without and with surfactant in high surfactant concentration range and the influence of the boundary layer effect plotted as permeate concentration vs. feed concentration.
Figure 4D:
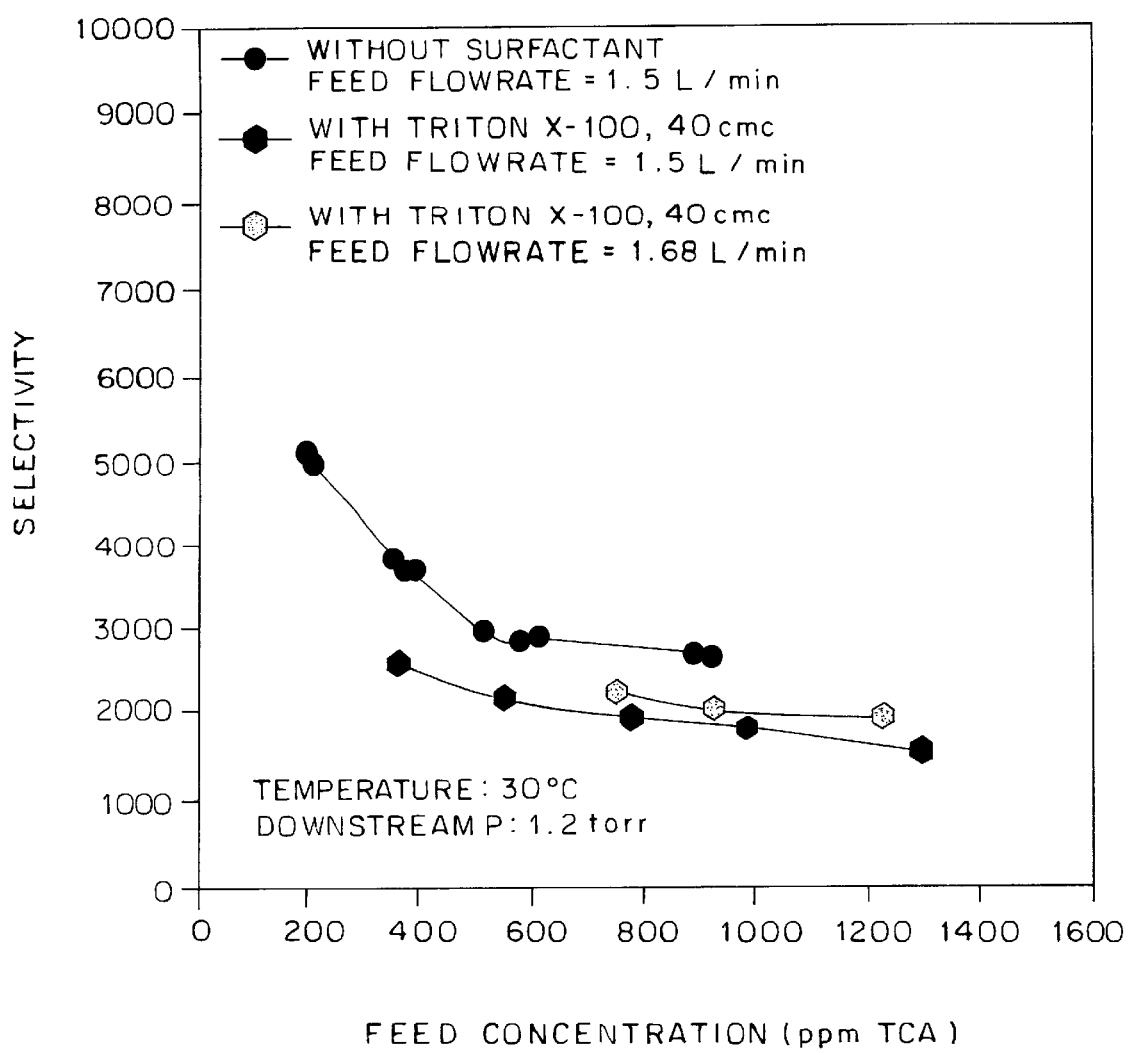
FIG. 4d shows a comparison of pervaporation without and with surfactant in high surfactant concentration and the influence of the boundary layer effect plotted as selectivity vs. feed concentration.

Feed solutions containing 40×CMC Triton X-100 and up to 6000 mg/L TCA were evaluated. All of these experiments were run under the same conditions: temperature, 30° C.; feed flow rate, 1.5 L/min; permeate pressure, 1.2 torr. The results are shown in FIGS. 3a, 3b, 3c and 3d. For ease of comparison, data from the 0, 0.25 and 4×CMC experiments are also plotted in FIGS. 3a–3d. the 0×CMC data do not extend beyond 1000 mg/L, as this is limited by the aqueous solubility of TCA of approximately 1200 mg/mL. As shown in FIG. 3a, the TCA flux increased linearly with TCA feed concentration up to 1000 mg/L TCA. Above this concentration, the TCA flux continued to rise with concentration, but not as rapidly. In fact, the TCA flux actually decreased beyond 5000 mg/l. Water flux, shown in FIG. 3b, also increased with increasing TCA concentration, but very slowly, and eventually levelled off. Permeate concentrations, shown in FIG. 3c, plateaued at 70–80 weight percent TCA for feed concentrations above 2000 mg/L TCA. In accordance with the general trend, selectivity, shown in FIG. 3d, decreased with increasing feed concentration, but the rate of decrease was low for TCA concentrations greater than 2000 mg/L.

EXAMPLE 3

Additional experiments were performed with 0×CMC and 40×CMC solutions at comparable TCA concentrations. The results of these experiments are shown in FIGS. 4a, 4b, 4c and 4d. The upper and lower data sets in the figures are the comparable 0×CMC and 40×CMC cases, respectively. Under the same operating conditions, differences do exist between pervaporation from a 40×CMC TritonX-100 solution and from an aqueous solution as indicated by the surfactant solutions exhibiting a lower TCA flux (FIG. 4a), permeate TCA concentration (FIG. 4c), and selectivity (FIG. 4d) than the 0×CMC solution. In general, the TCA flux for the 40×CMC solution is 40% lower than for the 0×CMC solution. Because of the low aqueous solubility of TCA, direct comparison beyond the range of TCA shown in FIG. 4 cannot be made. Although pervaporation performance is somewhat reduced at high surfactant concentrations, these results still indicate that pervaporation is capable of removing VOCs from surfactant solutions.

Pilot Unit Experiments

Pilot unit experiments were performed with a pervaporation apparatus equipped with four commercial spiral wound membrane modules connected in series. Each module was three feet long and had a diameter of 2 inches.

A 55 gallon stainless steel drum served as the feed tank. VOCs were added to the feed, either as an aqueous solution or as a solvent stream. The feed concentration was maintained substantially constant. The feed mixture was circulated between the feed tank and the pervaporation modules in a loop using a centrifugal liquid pump. Liquid flowrate was measured with a rotameter. The temperature of the feed liquid was held constant by passing the feed through a 30 kW electric heater. The feed liquid temperature was automatically monitored and controlled. A dry chemical vacuum pump supplied the vacuum to the membrane modules. A needle valve located between the pump and the membranes was used to control permeate vacuum pressure. Pressures ranging from 13 to 55 torr were studied. The permeate was condensed using 34° F. water, and collected in two reservoirs.

The pilot unit was equipped with three liquid sampling ports. The ports were located immediately before the membrane modules, after two models, and after all four modules. Samples removed from these ports were refereed to as Feed, Residual 1, Residual 2, respectively. Liquid samples were acquired after the unit had been operating for three hours, then hourly until hour six. An average of the concentrations from hours 4, 5 and 6 was used for further calculations. Steady-state behavior was observed after hour 3. One mL of each sample was immediately diluted to 100 mL with deionized water and transferred to a 40 mL vial and capped with a Teflon-lined septa and screw cap. Samples were analyzed by purge and trap gas chromatography in the same manner as described previously for Examples 1–3.

Performance of the pilot unit was described using the fraction of VOC in the feed which was removed during a particular experiment, based upon average feed and Residual 2 concentrations. Experiments without surfactant were performed to determine the baseline performance of the pilot unit with 1,1,1-trichloroethane and toluene as the model VOCs. An anionic surfactant, DOWFAX 8390, was selected for study based upon its proposed use in surfactant enhanced aquifer remediation processes. The surfactant was added to deionized water at 450 times its critical micelle concentration. The CMC of DOWFAX 8390 is 0.43 g/L as active ingredient.

EXAMPLE 4

Table 1 contains the results from a series of pilot unit experiments at fixed feed flow rate, temperature, and permeate vacuum pressure. When no surfactant was present, 99% of the TCA and 98% of the toluene in the feed water were removed. When 40 times the CMC of the anionic surfactant was present, under the same operating conditions, 91% of the TCA and 81% of the toluene were removed, indicating that pervaporation was effective at removing the VOCs even in the presence of surfactant micelles. Additionally, the removal of the VOCs from the surfactant solution was independent of the feed concentration over the range of 20 to 2800 mg/L for TCA and 15 to 800 mg/L for toluene.

TABLE 1

| Surfactant Conc. | Feed Flow Rate (gpm) | Temp. ° C. | Vacuum (torr) | TCA Feed Conc. (mg/L) | Toluene Feed Conc. (mg/L) | % TCA Removed | % Toluene Removed |
|---|---|---|---|---|---|---|---|
| 0 | 1.0 | 50 | 55 | 48.0 | 10.3 | 99.0 | 98.0 |
| 0 | 1.0 | 50 | 55 | 20.0 | 5.74 | 98.9 | 98.1 |
| 0 | 1.0 | 50 | 55 | 17.1 | 5.50 | 98.9 | 98.1 |
| 40xCMC | 1.0 | 50 | 55 | 94.9 | 57.3 | 90.5 | 81.1 |
| 40xCMC | 1.0 | 50 | 55 | 21.9 | 14.6 | 90.4 | 81.4 |
| 40xCMC | 1.0 | 50 | 55 | 799 | 62.2 | 91.3 | 82.4 |
| 40xCMC | 1.0 | 50 | 55 | 2835 | 804 | 91.8 | 83.1 |

EXAMPLE 5

Additional experiments were performed with the pilot unit with different flow rates and temperatures. Table 2 shows the results of tests at 0.5, 1.0 and 2.0- gallons/minute flow rate and at 50° C. and 60° C. for 40xCMC solutions. The single pass removal increased to 96% when the flow rate is lowered to 0.5 gpm and also increased to 95% when the temperature was increased from 50° to 60° C.

TABLE 2

| Surfactant Conc. | Feed Flow Rate (gpm) | Temp. ° C. | Vacuum (torr) | TCA Feed Conc. (mg/L) | Toluene Feed Conc. (mg/L) | % TCA Removed | % Toluene Removed |
|---|---|---|---|---|---|---|---|
| 40xCMC | 0.5 | 50 | 55 | 100 | 25 | 96.2 ± 0.1 | 91.6 ± 0.1 |
| 40xCMC | 1.0 | 50 | 55 | 20–2800 | 10–60 | 90.0 ± 0.7 | 81.8 ± 1.0 |
| 40xCMC | 2.0 | 50 | 55 | 200 | 10 | 81.3 ± 0.1 | 66.9 ± 0.1 |
| 40xCMC | 1.0 | 60 | 55 | 99.5 | 6.5 | 95.4 | 91.3 |

Thus, the present invention provides a method for cleaning VOC-laden aqueous streams emanating from surfactant washing of ground water or surfactant flushing of vadosezone soils.

The permeate obtained according to the present invention is generally a concentrated volatile organic compound. Where the cost for post-treating the permeate, which may contain some water and/or surfactant, is inexpensive and the recovered solvents are inexpensive, it may be cost-effective merely to discard the permeate in an acceptable manner. However, if the recovered volatile organic compounds are valuable, then it would be advantageous to recycle the volatile organic compounds for reuse.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

What is claimed is:

1. A method for removing volatile organic compounds from an emulsion comprising volatile organic compounds, water, and a surfactant, wherein the continuous phase of said emulsion is water, comprising passing said emulsion through a hydrophobic pervaporation membrane.

2. The method according to claim 1 wherein the surfactant is selected from the group consisting of nonionic surfactants and anionic surfactants.

3. The method according to claim 1 wherein the volatile organic compounds are reused.

4. The method according to claim 1 wherein the water is groundwater.

5. The method according to claim 1 wherein the emulsion is obtained from surfactant flushing of vadosezone soils.

6. The method according to claim 1 wherein the membrane is made of silicone rubber.

7. The method according to claim 1, wherein the membrane is made of a material selected from the group consisting of polyethylene, polypropylene, polydimethyl siloxane, poly(1-trimethylsiliyl-1-propyne), polyurethanes, polybutadiene polyether imides, polyether block polymers, styrene-butadiene rubbers, nitrile butadiene rubbers, and ethene-propene terpolymers.

8. A method for removing volatile organic compounds from groundwater contaminated with volatile organic compounds comprising:

flushing soil containing said contaminated groundwater with a surfactant to form an emulsion of surfactant, water, and volatile organic compounds; and passing said emulsion through a hydrophobic pervaporation membrane.

9. The method according to claim 8 wherein the surfactant is selected from the group consisting of nonionic surfactants and anionic surfactants.

10. The method according to claim 8 wherein the volatile organic compounds are reused.

11. The method according to claim 8 wherein the emulsion is obtained from surfactant flushing of vadosezone soils.

12. The method according to claim 8 wherein the membrane is made of silicone rubber.

13. The method according to claim 8 wherein the membrane is made of a material selected from the group consisting of polyethylene, polypropylene, polydimethyl siloxane, poly(1-trimethylsiliyl-1-propyne), polyurethane polybutadiene polyether imides, polyether block polymers, styrene-butadiene rubbers, nitrile butadiene rubbers, and ethene-propene terpolymers.

* * * * *